(12) United States Patent
Mickols et al.

(10) Patent No.: US 7,882,963 B2
(45) Date of Patent: Feb. 8, 2011

(54) MODIFIED MEMBRANE

(75) Inventors: William E. Mickols, Chanhassen, MN (US); Richard C. Krauss, Ft. Myers, FL (US); Q. Jason Niu, Excelsior, MN (US); Carleton L Gaupp, Hilton, NY (US)

(73) Assignee: Dow Global Technologies Inc., Midland, MI (US)

( * ) Notice: Subject to any disclaimer, the term of this patent is extended or adjusted under 35 U.S.C. 154(b) by 324 days.

(21) Appl. No.: 12/299,849

(22) PCT Filed: Apr. 12, 2007

(86) PCT No.: PCT/US2007/009001

§ 371 (c)(1),
(2), (4) Date: Nov. 6, 2008

(87) PCT Pub. No.: WO2007/133362

PCT Pub. Date: Nov. 22, 2007

(65) Prior Publication Data

US 2009/0159527 A1     Jun. 25, 2009

Related U.S. Application Data

(60) Provisional application No. 60/799,863, filed on May 12, 2006.

(51) Int. Cl.
*B01D 71/56* (2006.01)
*B01D 71/00* (2006.01)

(52) U.S. Cl. ............... 210/500.38; 210/500.37; 210/500.4

(58) Field of Classification Search ............ None
See application file for complete search history.

(56) References Cited

U.S. PATENT DOCUMENTS

| | | | |
|---|---|---|---|
| 4,277,344 A | 7/1981 | Cadotte |
| 4,353,802 A | 10/1982 | Hara et al. |
| 4,765,897 A | 8/1988 | Cadotte et al. |
| 4,769,148 A | 9/1988 | Fibiger et al. |
| 4,812,270 A | 3/1989 | Cadotte et al. |
| 4,824,574 A | 4/1989 | Cadotte et al. |
| 4,833,014 A | 5/1989 | Linder et al. |
| 4,839,203 A | 6/1989 | Davis et al. |
| 4,859,384 A | 8/1989 | Fibiger et al. |
| 4,872,984 A | 10/1989 | Tomaschke |
| 4,888,116 A | 12/1989 | Cadotte et al. |

(Continued)

FOREIGN PATENT DOCUMENTS

KR     10/2005-0074161     7/2005

OTHER PUBLICATIONS

U.S. Appl. No. 12/023,082(co-pend. appl. sharing at least one common inventor), filed Jan. 31, 2008, Q. Jason Niu, et al.

*Primary Examiner*—Krishnan S Menon
(74) *Attorney, Agent, or Firm*—Edward W. Black

(57) ABSTRACT

A multilayered modified membrane and method for making the same, comprising a modified discriminating layer that can have a fouling resistant surface, improved salt rejection, antimicrobial properties, and/or improved solute, and/or small organics rejection as compared to membranes with unmodified discriminating layers.

13 Claims, 1 Drawing Sheet

U.S. PATENT DOCUMENTS

| | | | |
|---|---|---|---|
| 4,909,943 A | 3/1990 | Fibiger et al. | |
| 4,950,404 A | 8/1990 | Chau | |
| 4,964,998 A | 10/1990 | Cadotte et al. | |
| 4,981,497 A | 1/1991 | Hayes | |
| 4,983,291 A | 1/1991 | Chau et al. | |
| 5,059,659 A | 10/1991 | Gregor et al. | |
| 5,108,464 A * | 4/1992 | Friesen et al. | 95/52 |
| 5,178,766 A | 1/1993 | Ikeda et al. | |
| 5,576,057 A | 11/1996 | Hirose et al. | |
| 5,614,099 A | 3/1997 | Hirose et al. | |
| 5,733,602 A | 3/1998 | Hirose et al. | |
| 5,755,964 A | 5/1998 | Mickols | |
| 5,843,351 A | 12/1998 | Hirose et al. | |
| 5,876,602 A | 3/1999 | Jons et al. | |
| 5,922,161 A * | 7/1999 | Wu et al. | 156/272.6 |
| 5,989,426 A | 11/1999 | Hirose et al. | |
| 6,024,873 A | 2/2000 | Hirose et al. | |
| 6,280,853 B1 | 8/2001 | Mickols | |
| 6,337,018 B1 * | 1/2002 | Mickols | 210/500.38 |
| 6,878,278 B2 | 4/2005 | Mickols | |
| 6,913,694 B2 | 7/2005 | Koo et al. | |
| 7,001,518 B1 | 2/2006 | Tomaschke | |
| 7,279,097 B2 | 10/2007 | Tomioka et al. | |
| 7,491,334 B2 | 2/2009 | Comstock | |
| 2005/0056589 A1 | 3/2005 | Hendel et al. | |
| 2005/0077243 A1 | 4/2005 | Pinnau et al. | |
| 2007/0039874 A1 | 2/2007 | Kniajanski et al. | |
| 2007/0175820 A1 | 8/2007 | Koo et al. | |
| 2007/0175821 A1 | 8/2007 | Koo et al. | |
| 2007/0251883 A1 | 11/2007 | Niu | |
| 2007/0284309 A1 * | 12/2007 | Tomioka | 210/656 |
| 2008/0000843 A1 * | 1/2008 | Sasaki et al. | 210/753 |

* cited by examiner

MODIFIED MEMBRANE

CROSS REFERENCE TO RELATED APPLICATIONS

This application is a National Stage application filed pursuant to 35 USC 371 and claims the benefit of international application no. PCT/US2007/009001 filed 12 Apr. 2007, which claims the benefit of US 60/799,863 filed 12 May 2006. The entire contents of PCT/US2007/009001 and US 60/799,863 are incorporated herein by reference.

FIELD OF THE DISCLOSURE

The present disclosure generally relates to membranes for use in separating liquid components and methods of making such membranes. The membranes of the present disclosure are particularly useful in purifying water.

BACKGROUND

Reverse osmosis and nanofiltration membranes are used to separate dissolved or dispersed materials from feed streams. The separation process typically involves bringing an aqueous feed solution into contact with one surface of the membrane under pressure so as to effect permeation of the aqueous phase through the membrane while permeation of the dissolved or dispersed materials is prevented.

Both reverse osmosis and nanofiltration membranes typically include a thin film discriminating layer fixed to a porous support, collectively referred to as a "composite membrane." Ultrafiltration and microfiltration membranes may also have a composite arrangement. The support provides physical strength but offers little resistance to flow due to its porosity. On the other hand, the discriminating layer is less porous and provides the primary means of separation of dissolved or dispersed materials. Therefore, it is generally the discriminating layer which determines a given membrane's "rejection rate," i.e., the percentage of the particular dissolved material (i.e., solute) rejected, and "flux," i.e., the flow rate per unit area at which the solvent passes through the membrane.

Membrane manufacturers optimize the discriminating layer for a desired combination of solvent flux and solute rejection, while also optimizing the porous support layer for maximum strength and compression resistance combined with a minimum resistance to permeate flow. In theory, a large variety of chemical compositions could be formed into thin barrier layers, however, only a few polymers offer the right combination of flux and solute rejection to generate commercially attractive reverse osmosis or nanofiltration membranes. Reverse osmosis membranes and nanofiltration membranes vary from each other with respect to their degree of permeability to different ions and compounds.

Reverse osmosis membranes are relatively impermeable to virtually all ions, including sodium and chlorine ions. Therefore, reverse osmosis membranes are widely used for the desalination of brackish water or seawater to provide relatively non-salty water for industrial, commercial, or domestic use, because the rejection rate of sodium and chlorine ions for reverse osmosis membranes is usually from about ninety-five (95) to about one hundred (100) percent.

Nanofiltration membranes are usually more specific for the rejection of ions including radium, magnesium, calcium, sulfate, and carbonate. In addition, nanofiltration membranes can be impermeable to organic compounds having molecular weights above about two hundred (200) Daltons. Additionally, nanofiltration membranes can have higher fluxes at comparable pressures than reverse osmosis membranes. These characteristics render nanofiltration membranes useful in such diverse applications as the "softening" of water and the removal of pesticides from water. As an example, nanofiltration membranes can have a sodium chloride rejection rate of from about zero (0) to about ninety-five (95) percent but have a relatively high rejection rate for salts such as magnesium sulfate and in some cases organic compounds such as atrazine.

Some membranes can be useful for reverse osmosis and nanofiltration applications by including a polyamide discriminating layer. The polyamide discriminating layer for reverse osmosis membranes is often obtained by an interfacial polycondensation reaction between a polyfunctional amine monomer and a polyfunctional acid halide monomer as described in, for example, U.S. Pat. No. 4,277,344. The polyamide discriminating layer for nanofiltration membranes can be obtained via an interfacial polymerization between a piperazine, a cyclohexane bearing at least two reactive amine or aminoalkyl groups, or a piperidine bearing at least one reactive amine or aminoalkyl group and a polyfunctional acid halide as described in U.S. Pat. Nos. 4,769,148 and 4,859,384. Another way of obtaining polyamide discriminating layers suitable for nanofiltration is via the methods described in, for example, U.S. Pat. Nos. 4,765,897; 4,812,270; and 4,824,574. These patents describe changing a reverse osmosis membrane, such as those of U.S. Pat. No. 4,277,344, into a nanofiltration membrane.

Composite polyamide membranes can be prepared by coating a porous support with a polyfunctional amine monomer, for example, from an aqueous solution. Although water is a preferred solvent, non-aqueous solvents may be utilized, such as acetyl nitrile and dimethylformamide (DMF). A polyfunctional acid halide monomer can subsequently be coated on the support, for example, from an organic solution. Although no specific order of addition is necessarily required, the amine solution can be coated first on the porous support followed by the acid halide solution. Although one or both of the polyfunctional amine and acid halide may be applied to the porous support from a solution, they may alternatively be applied by other means such as by vapor deposition, or neat.

Membrane fouling can occur from adhesion of suspended particles, scaling by insoluble salts, and bacterial fouling. While changing the polymer of the membrane may change properties such as the permeability to various ions, the membrane surface energy, or the membrane surface charge, it would also require large changes in membrane fabrication.

Membrane manufacture can be done in a dedicated facility with lines operating in a semi-continuous process. Introducing membranes with new starting materials and membrane coating processes can be time-consuming and expensive. It can be less expensive to make use of existing process lines and materials to make a variety of different composite membranes.

Means for improving the performance of membranes by the addition of constituents to the amine and/or acid halide solutions are described in the literature. For example, U.S. Pat. No. 4,950,404, issued to Chau, describes a method for increasing flux of a composite membrane by adding a polar aprotic solvent and an optional acid acceptor to the aqueous amine solution prior to interfacially polymerizing the amine with a polycarboxylic acid halide. Similarly, U.S. Pat. Nos. 6,024,873; 5,989,426; 5,843,351; 5,733,602; 5,614,099; and 5,576,057 to Hirose, et al. describe the addition of selected alcohols, ethers, ketones, esters, halogenated hydrocarbons, nitrogen-containing compounds and sulfur-containing compounds having a solubility parameter of 8 to 14 $(cal/cm^3)^{1/2}$ to the aqueous amine solution and/or organic acid halide solution prior to interfacial polymerization.

Methods of improving membrane performance by post-treatment are also known. For example, U.S. Pat. No. 5,876,602 to Jons, et al. describes treating a polyamide composite membrane with an aqueous chlorinating agent to improve flux, lower salt passage, and/or increase membrane stability to base. U.S. Pat. No. 5,755,964 to Mickols discloses a process wherein the polyamide discriminating layer is treated with ammonia or selected amines, e.g., butylamine, cyclohexylamine, and 1,6 hexane diamine. U.S. Pat. No. 4,765,897 to Cadotte discloses the post treatment of a membrane with a strong mineral acid followed by treatment with a rejection enhancing agent.

SUMMARY

Embodiments of the present disclosure provide multilayered membranes including a modified discriminating layer that can have improved rejection as compared to a membrane with an unmodified discriminating layer. Embodiments also include methods for making such membranes, including methods which are adaptable to commercial scale membrane manufacturing. In addition, embodiments of the present disclosure can be suited for making both nanofiltration and reverse osmosis membranes.

DETAILED DESCRIPTION

Figure 1:
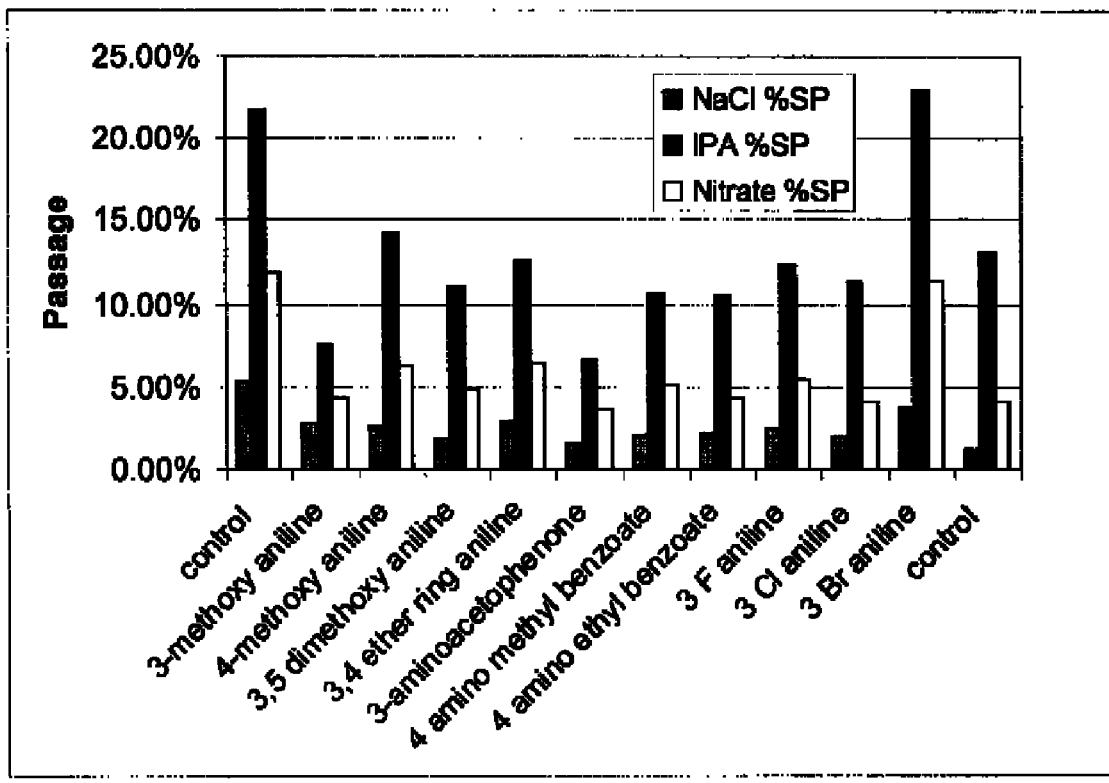
FIG. 1 presents the sodium chloride, isopropyl alcohol, and nitrate passage percentage in membranes with a modified discriminating layer.

Embodiments of the present disclosure include a multilayered membrane with a modified discriminating layer and methods for making the same. Embodiments also include a membrane with a modified discriminating layer having improved rejection. Further, embodiments include a membrane with a modified discriminating layer having improved antimicrobial properties. Embodiments of the present disclosure exhibit improvements over membranes with unmodified discriminating layers.

The membrane of the present disclosure can include a modified discriminating layer, where the discriminating layer is modified by applying a modifying composition to the discriminating layer. The modifying composition is disposed on at least the surface portion of the discriminating layer to form a modifying composition layer secured to the discriminating layer by at least one of hydrogen bonding, ionic bonding, covalent bonding, physical entanglement, and chemical linkage. As used herein, "physical entanglement" refers to the process of having long chains of molecules, for example, polymers such as a phenyl amine becoming entangled in each other or, for example, a polyamide contained in a polyamide discriminating layer instead of becoming chemically bonded to the discriminating layer. In some embodiments, the chemical linkage can be at least one of amides, sulfamides, urethanes, ureas, thioesters, and amines, including secondary amines, ternary amines, quarternary amines, and beta hydroxylamines.

In some embodiments, the membrane of the present disclosure can be prepared by a post-treatment on an already formed discriminating layer, such as a composite polyamide reverse osmosis membrane (e.g., "FT-30™" available from FilmTec Corporation). In some embodiments, the post-treatment can be performed by adding the various compounds to an aqueous solution and coating the aqueous solution onto the already formed discriminating layer. Further process steps can then also be performed, as discussed herein. In various embodiments, the modification can be accomplished during membrane fabrication, (e.g., just after the initiation of the interfacial polymerization of the polyamine and polyfunctional acid halide reaction, as discussed herein). In embodiments where the modifying composition is not soluble in an aqueous solution, the modification can be accomplished during membrane fabrication by adding the various compounds to the aqueous solution. As the aqueous solution goes through the membrane, the various compounds may be at a higher concentration on the surface of the discriminating layer, and may become secured to the discriminating layer by hydrogen bonding, ionic bonding, covalent bonding, physical entanglement and/or by forming chemical linkages. In some embodiments, the type of securing and/or the degree of securing can depend on the molecular weight and the chemical composition of the various compounds that are applied to the discriminating layer, and/or the molecular weight and the chemical composition of reaction products formed from mixing the various compounds. The presence of the various compounds used to modify the surface of the discriminating layer, as discussed herein, can provide the membrane with one or more improvements including: a fouling resistant surface, improved salt rejection, improved solute rejection, improved small organic rejection, and/or improved antimicrobial properties as compared to membranes with unmodified discriminating layers. As used herein, "rejection" refers to the percentage of solute concentration removed from system feed water by the membranes.

The membrane of the present disclosure can be prepared by applying an aqueous coating composition to at least a surface portion of a porous substrate to form a first-coated substrate. The aqueous coating composition can include at least one polyfunctional compound selected from a polyfunctional amine, a polyfunctional alcohol, a polyfunctional thiol, and a polyfunctional anhydride.

In some embodiments, the concentration of the polyfunctional compound in the aqueous coating composition can be in a range of approximately 0.1 to ten (10) weight percent, and preferably in a range of approximately 0.5 to seven (7.0) weight percent, based on total aqueous coating composition weight. In addition, coating can be accomplished by spraying, film coating, rolling, or through the use of a dip tank, among other coating techniques. Excess solution can be removed from the support by air and/or water knifes, dryers, or ovens, among others.

Next, an organic solvent composition can be applied to the first-coated substrate to form a discriminating layer on at least the surface portion of the porous substrate. The organic solvent composition can include an organic solvent and at least one of a polyfunctional acid halide, a polyfunctional anhydride, and a polyfunctional dianhydride. The polyfunctional acid halide can be dissolved in the non-polar organic solvent in a range from about 0.01 to five (5) weight percent, preferably 0.02 to two (2) weight percent, based on total non-polar organic solvent weight, and delivered as part of a continuous coating operation.

The discriminating layer formed from the interfacial polymerization of the aqueous coating composition and the organic solvent composition can comprise a reaction product of the polyfunctional compound and at least one of the polyfunctional acid halide, the polyfunctional anhydride, and the polyfunctional dianhydride and a residual reactive moiety, as discussed further herein.

In some embodiments, the discriminating layer can be a polyamide discriminating layer. A polyamide discriminating layer can be prepared by interfacially polymerizing a polyfunctional compound, (e.g., a polyfunctional amine monomer) with a polyfunctional acid halide, wherein each term is intended to refer both to the use of a single species or multiple species of amines in combination or acid halides in combination, on at least one surface of a porous support. As used herein, "polyamide" is a polymer in which amide linkages (—C(O)NH—) occur along the molecular chain.

As discussed herein, the polyfunctional amine monomer and polyfunctional acid halide can be delivered to the porous support by way of a coating step from solution, where the polyfunctional amine monomer can be coated from an aqueous solution and the polyfunctional acid halide can be coated from an organic solvent. Although the coating steps can be "non-sequential" (i.e., follow no specific order), the polyfunctional amine monomer is preferably coated on the porous support first followed by the polyfunctional acid halide.

The polyfunctional amine monomer used in the present disclosure to form a polyamide discriminating layer may have primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris(2-diaminoethyl)amine). Examples of preferred polyfunctional amine monomers include primary amines having two or three amino groups, for example, m-phenylene diamine (MPD), and secondary aliphatic amines having two amino groups, for example, piperazine. As discussed herein, the polyfunctional amine monomer can be applied to the porous support as an aqueous coating composition. Once coated on the porous support, excess aqueous coating composition may be optionally removed.

As discussed herein, the polyfunctional acid halide is preferably coated from an organic solvent, although the polyfunctional acid halide may be delivered from a vapor phase (e.g., for polyfunctional acid halides having sufficient vapor pressure). The polyfunctional acid halide is not particularly limited, and aromatic or alicyclic polyfunctional acid halides can be used. Non-limiting examples of aromatic polyfunctional acid halides include, trimesic acid chloride, terephthalic acid chloride, isophthalic acid chloride, biphenyl dicarboxylic acid chloride, and naphthalene dicarboxylic acid dichloride. Non-limiting examples of alicyclic polyfunctional acid halides include cyclopropane tri carboxylic acid chloride, cyclo butane tetra carboxylic acid chloride, cyclo pentane tri carboxylic acid chloride, cyclo pentane tetra carboxylic acid chloride, cyclo hexane tri carboxylic acid chloride, tetrahydrofuran tetra carboxylic acid chloride, cyclo pentane dicarboxylic acid chloride, cyclo butane dicarboxylic acid chloride, cyclo hexane dicarboxylic acid chloride, and tetrahydrofuran dicarboxylic acid chloride. One preferred polyfunctional acid halide is trimesoyl chloride (TMC).

Suitable organic solvents are those which are capable of dissolving the polyfunctional acid halide and are immiscible with water. Preferred solvents include those which do not pose a threat to the ozone layer and yet are sufficiently safe in terms of their flashpoints and flammability to undergo routine processing without having to undertake extreme precautions. Higher boiling hydrocarbons, i.e., those with boiling points greater than about ninety $(90)°$ C. such as hydrocarbons with eight to fourteen carbon atoms, and mixtures thereof, have more favorable flashpoints than hydrocarbons containing five to seven carbon atoms, but they are less volatile. As such, useful organic solvents include hydrocarbons such as n-hexane or cyclo-hexane, high purity isoparaffinic materials such as Isopar™ (Exxon), or halogenated hydrocarbons such as Freon™ (E.I. DuPont Co.), which includes trifluorotrichloroethane.

Once brought into contact with one another, the polyfunctional acid halide and the polyfunctional amine monomer react at their surface interface to form the polyamide discriminating layer.

The reaction time of the polyfunctional acid halide and the polyfunctional amine monomer can be less than one second but contact time ranges from one to sixty seconds, after which excess liquid may optionally be removed, by way of an air knife, water bath(s), dryer, and the like. The removal of the excess water and/or organic solvent can be achieved by drying at elevated temperatures, for example, from about forty $(40)°$ C. to about one hundred twenty $(120)°$ C., although air drying at ambient temperatures may be used.

Embodiments of the present disclosure include methods of modifying the discriminating layer, prepared as discussed herein, by applying a modifying composition to at least a surface portion of the discriminating layer to form a modified discriminating layer. The modifying composition can include an organic solvent and a reactive modifying compound including a functional group, as discussed further herein.

As discussed herein, the discriminating layer can include a reaction product of the polyfunctional compound and at least one of the polyfunctional acid halide, the polyfunctional anhydride, and the polyfunctional dianhydride and residual reactive moieties. The residual reactive moiety can be at least one of an unreacted functional group on the polyfunctional compound, an unreacted functional group on the polyfunctional acid halide, an unreacted functional group on the polyfunctional anhydride, and an unreacted functional group on the polyfunctional dianhydride. The residual reactive moiety can also be a hydrolysis product of the polyfunctional compound, a hydrolysis product of the polyfunctional acid halide, a hydrolysis product of the polyfunctional anhydride, and/or the hydrolysis product of the polyfunctional dianhydride.

Preferably, the modifying composition can be applied after interfacial polymerization to form the discriminating layer, but before steps that might limit or remove residual reactive moieties on the discriminating layer, such as rinsing or drying steps. In addition, by applying the modifying composition at such a point in the method, fewer changes may be needed to an existing membrane manufacturing process. However, embodiments include processes where the modifying composition is applied to the discriminating layer at any time in the process after the organic solvent composition containing the polyfunctional acid halide is applied, as discussed herein. The method of the present disclosure merely requires that a sufficient number of residual reactive moieties are available on the discriminating layer. In some embodiments, the appropriate number of residual reactive moieties will depend on the desired changes.

To modify the discriminating layer, embodiments of the present disclosure take advantage of the residual reactive moieties on the discriminating layer that remain after the interfacial polymerization reaction step, as discussed herein. In some embodiments, the residual reactive moieties available on the discriminating layer can depend on the starting materials for the interfacial polymerization. For example, in embodiments where the polyfunctional amine monomer is meta-phenylene diamine (MPD) and the polyfunctional acid halide is trimesic acid chloride (TMC), the reactive moieties on the discriminating layer can include derivates of polyfunctional amines and polyfunctional acid chlorides. Therefore, the discriminating layer can include two sites (e.g., Y and Z), for added groups shown in formula (I):

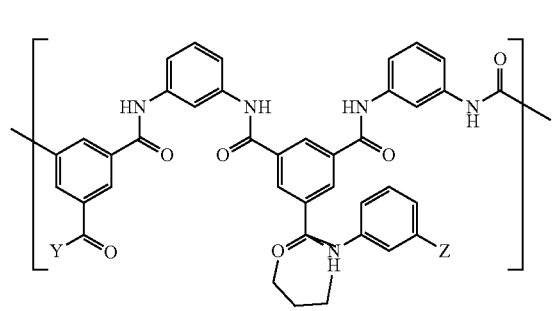

(I)

Separately, the polyfunctional amine can be represented by formula (II):

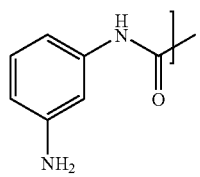

(II)

and carboxylic acids present as a reactive moiety on the discriminating layer, resulting from the hydrolysis of the polyfunctional acid chloride, can be represented by formula (III):

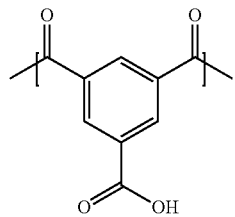

(III)

As discussed herein, the method of making the membrane includes applying a modifying composition to at least a surface portion of the discriminating layer to form a modified discriminating layer. In some embodiments, the modifying composition can include an organic solvent and a reactive modifying compound including a functional group. In some embodiments, the organic solvent of the modifying compositions can be the same as the solvent used for the polyfunctional acid halide, as discussed herein.

In previous approaches to improve rejection of an existing membrane, modifying the membrane involved adding modifiers to the aqueous phase, usually in, or after, a rinse or hydrolysis step. Therefore, the modifiers were limited to water-soluble polymers and chemicals, limiting the selection of functional groups that can be used with the membrane. Embodiments of the present disclosure, however, include reactive modifying compounds that are soluble, or at least dispersible, in an organic solvent. The use of organic solvents can allow for the use of a wide selection of reactive modifying compounds and can dissolve higher molecular weight reactive modifying compounds, such as aromatics and aliphatics having five (5) or more carbon atoms. In addition, since organic solvents are less soluble in water, organic soluble reactive modifying compounds can be less likely to be removed and/or washed out during the use of the resulting multilayered membrane in water purification processes.

In addition, an aspect of embodiments of the present disclosure is selecting reactive modifying compounds that change the selectivity properties of the discriminating layer without significantly reducing the flux below commercial requirements across the membrane. The reactive modifying compound can be selected from substituted or unsubstituted aromatic compounds, cyclo-aliphatic compounds, pyridines, or linear aliphatic compounds having five (5) or more members.

In embodiments where the reactive modifying compound includes a functional group that reacts with the discriminating layer to secure the modifying composition to the discriminating layer through chemical linkage, the reactive modifying compound can include a functional group that will form an amine, an amide, a sulfamide, a urethane, a urea, a thioester, an aminoester, an esteramide, an imide, a secondary amine, a ternary amine, a quarternary amine, or a beta hydroxylamine linkage with the residual reactive moieties on the discriminating layer. Preferable reactive modifying compounds can be selected from aniline derivatives and linear or cyclic amines having five (5) or more carbon atoms.

In some embodiments, it is preferable to select reactive modifying compounds that can provide a rigid linkage between the amide, isocyanate, urethane, urea, sulfamide, thioester, aminoester, esteramide, imide, secondary amine, ternary amine, quarternary amine, or beta hydroxylamine and the functional group. This can allow for more improved rejection and selectivity.

As discussed herein, the reactive modifying compound can include a functional group. The functional group can be selected from the group consisting of amine, aminoalcohol, aminoester, ester, thioester, ether, alcohol, anhydride, epoxide, acid halide, isocyanate, 2-oxazoline, thiol, thiophenol, disulfide, and azide. In addition, also discussed herein, in some embodiments the functional group can react with residual reactive moieties on the discriminating layer to form chemical linkages.

In embodiments where the functional group reacts with the residual reactive moieties on the discriminating layer to form chemical linkages, the modifying compound can include a functional group selected based on the residual reactive moiety that the functional group is most likely to react with. For example, as discussed herein, a residual reactive moiety can be an amine in a polyamide discriminating layer. Possible functional groups that can react efficiently with such amines can include acid halides, epoxides, isocyanates, diisocyanates, and azides. For example, an aliphatic epoxy modifying compound can react with a residual amine moiety to form a beta hydroxylamine. Similarly, an aliphatic isocyanate modifying compound can react with a residual amine moiety to form a substituted urea, and a diisocyanate modifying compound can react with a residual amine moiety to form a urethane.

In some embodiments, the residual reactive moiety can be an acid halide and/or a carboxylic acid in the polyamide discriminating layer. In such embodiments, amines, 2-oxazolines, and alcohols are among the available basic and/or nucleophilic, organic soluble compounds that can be selected for a functional group on the modifying compound. In various embodiments, aromatic structures are preferred, as they are stable enough to be handled without extreme health and safety concerns. Additionally, larger modifying compounds can create more significant changes in selectivity properties in the modified discriminating layer, and thus the membrane, as compared to smaller modifying compounds.

An example of a modifying compound to react with a residual acid halide moiety and/or residual carboxylic acid moiety is aniline. The amine on the aniline can react with an unreacted acid chloride and/or carboxylic acid on the discriminating layer. Other suitable reactive modifying compounds for reacting with acid halides and/or carboxylic acids include, but are not limited to, aliphatic secondary amines, aromatic amines, tertiary amines, and amides.

Other embodiments include a modifying compound with a functional group selected from the group including ester, thioester, ether, alcohol, anhydride, 2-oxazoline, thiol, thiophenol, and disulfide. It follows, then, that the reactive modifying compound can be selected from aliphatic amines, aromatic amines, azides, isocyanates, esters, anhydrides, epoxides, 2-oxazolines, amides, tresylates, tosylates, and mesylates, among others.

In some embodiments, the reactive modifying compound can include the functional group, as discussed herein, and a pendent functional group. In some embodiments, the pendent functional group can be chosen to change one or more properties of the discriminating layer. For example, a pendent functional group can be an organometallic that will provide a discriminating layer with antimicrobial properties. In some embodiments, the reactive modifying compound can include the functional group to react with residual reactive moieties on the discriminating layer to create chemical linkages and the pendent functional group to change properties of the discriminating layer.

In some embodiments, the reactive modifying compound can include one pendent functional group. However, embodiments also include reactive modifying compounds with multiple pendent functional groups. In addition, the reactive modifying compound can include multiple pendent functional groups of the same compound and/or multiple pendent functional groups that are different compounds.

In some embodiments, the reactive modifying compound can include a pendent functional group selected from alkyl group, alkene group, alkyne group, aliphatic amine (including primary, secondary, or ternary amine), aromatic amine, ester, ketone, aldehyde, thioester, amide, sulfamide, alcohol, ether, isocyanate, thiol, sulfide, disulfide, sulfate, sulfite, thiophenol, thiophene, halogen, silyl, silicone containing organometallic compounds, phosphorous containing organometallic compounds, other organometallic compounds, and metal complexes. The pendent functional group can also be selected from organometallic derivatives of aliphatic amines, aromatic amines, amides, sulfamides, ureas, esters, ethers, acids, alcohol, and urethanes. In embodiments where the reactive modifying compound is an aliphatic or aromatic thiol, the pendent functional group(s) can be a metal ion. In addition, in embodiments where the reactive modifying compound is an aliphatic with five (5) or more carbons, the pendent functional group can be a quaternary amine, which is a biocidal group and can give the resulting membrane biocidal properties.

In embodiments where the functional group is an amine, the reactive modifying compound can be a phenyl amine and the pendent functional group can be selected from halides, ethers, esters, ketones, aldehydes, alcohols, thiols, methiols, amines, phosphorous, metal complexes, and organometallics. Formula (IV) represents possible candidate positions for the pendent functional groups, where the reactive modifying compound is a phenyl and the functional group is an amine.

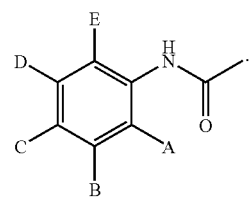

(IV)

In formula (IV), A, B, C, D, and E represent the various positions that a pendent functional group on an aromatic ring can occupy. As discussed herein, more than one pendent functional group can be attached to the ring, and each pendent functional group can be the same or different. In some embodiments, two and/or three of the same pendent functional group can be attached to the ring to more effectively change the property of the discriminating layer, as compared to using one pendent functional group attached to the ring. As discussed herein, pendent functional groups can also be attached to aliphatic reactive modifying compounds.

In embodiments where the reactive modifying compound is a phenyl amine, a non-IUPAC name that identifies the resultant pendent functional group will be used. For example, m-phenetidine would be named 3-ethoxyaniline or m-ethoxyaniline, which leaves an ethoxy pendent functional group. Similarly, 3-aminothiophenol would be named 3-thioaniline, and the resultant pendent functional group is a thiol. Finally if MPD is used, it would be named 3-aminoaniline and the pendent functional group would be an amine.

In some embodiments, the reactive modifying compound can be a phenyl amine, and the pendent functional group can be selected from halides and thiols. Such embodiments include, but are not limited to, reactive modifying compounds selected from: 2 chloro aniline, 3 chloro aniline, 4 chloro aniline, 2,3 dichloro aniline, 2,4 dichloro aniline, 2,5 dichloro aniline, 3,4 dichloro aniline, 3,5 dichloro aniline, 2,6 dichloro aniline, 2,3,4 trichloro aniline, 3,4,5 trichloro aniline, 2,4,5 trichloro aniline, 2,4,6 trichloro aniline, 3,4,5,6 tetrachloro aniline, 2,4,5,6 tetrachloro aniline, 2,3,5,6 tetrachloro aniline, 2,3,4,5,6 pentachloro aniline, 2 bromo aniline, 3 bromo aniline,4 bromo aniline, 2,3 dibromo aniline,2,4 dibromo aniline, 2,5 dibromo aniline, 2,6 dibromo aniline, 3,4 dibromo aniline, 3,5 dibromo aniline, 2,3,4 tribromo aniline, 3,4,5 tribromo aniline, 2,4,5 tribromo aniline, 2,4,6 tribromo aniline, 3,4,5,6 tetrabromo aniline, 2,4,5,6 tetrabromo aniline, 2,3,5,6 tetrabromo aniline, 2,3,4,5,6 pentabromo aniline, 2 fluoro aniline, 3 fluoro aniline, 4 fluoro aniline, 2,3 difluoro aniline, 2,4 difluoro aniline, 2,5 difluoro aniline, 2,6 difluoro aniline, 3,4 difluoro aniline, 3,5 difluoro aniline, 2,3,4 trifluoro aniline, 3,4,5 trifluoro aniline, 2,4,5 trifluoro aniline, 2,4,6 trifluoro aniline, 3,4,5,6 tetrafluoro aniline, 2,4,5,6 tetrafluoro aniline, 2,3,5,6 tetrafluoro aniline, 2,3,4,5,6 pentafluoro aniline, 2 iodo aniline, 3 iodo aniline, 4 iodo aniline, 2,3 diiodo aniline, 2,4 diiodo aniline, 2,5 diiodo aniline, 2,6 diiodo aniline, 3,4 diiodo aniline, 3,5 diiodo aniline, 2,3,4 triiodo aniline, 3,4,5 triiodo aniline, 2,4,5 triiodo aniline, 2,4,6 triiodo aniline, 3,4,5,6 tetraiodo aniline, 2,4,5,6 tetraiodo aniline, 2,3,5,6 tetraiodo aniline, 2,3,4,5,6 pentaiodo aniline, 2 methoxy aniline, 3 methoxy aniline, 4 methoxy aniline, 2,3 dimethoxy aniline, 2,4 dimethoxy aniline, 2,5 dimethoxy aniline, 2,6 dimethoxy aniline, 3,4 dimethoxy aniline, 3,5 dimethoxy aniline, 2,3,4 trimethoxy aniline, 3,4,5 trimethoxy aniline, 2,4,5 trimethoxy aniline, 2,4,6 trimethoxy aniline, 2,3,4,5 tetramethoxy aniline, 2,3,4,5,6 pentamethoxy aniline, 2 ethoxy aniline, 3 ethoxy aniline, 4 ethoxy aniline, 2,3 diethoxy aniline, 2,4 diethoxy aniline, 2,5 diethoxy aniline, 2,6 diethoxy aniline, 3,4 diethoxy aniline, 3,5 diethoxy aniline, 2,3,4 triethoxy aniline, 3,4,5 triethoxy aniline, 2,4,5 triethoxy aniline, 2,4,6 triethoxy aniline, 2 propoxy aniline, 3 propoxy aniline, 4 propoxy aniline, 2,3 dipropoxy aniline, 2,4 dipropoxy aniline, 2,5 dipropoxy aniline, 2,6 dipropoxy aniline, 3,4 dipropoxy aniline, 3,5 dipropoxy aniline, 2,3,4 tripropoxy aniline, 3,4,5 tripropoxy aniline, 2,4,5 tripropoxy aniline, 2,4,6 tripropoxy aniline, 2 butoxy aniline, 3 butoxy aniline, 4 butoxy aniline, 2,3 dibutoxy aniline, 3,4 dibutoxy aniline, 3,5 dibutoxy aniline, 2,3,4 tributoxy aniline, 3,4,5 tributoxy aniline, 2 hydrothio aniline, 3 hydrothio aniline, 4 hydrothio aniline, 2,3 dihydrothio aniline, 2,4 dihydrothio aniline, 2,5 dihydrothio aniline, 2,6 dihydrothio aniline, 3,4 dihydrothio aniline, 3,5 dihydrothio aniline, 2 methylthio aniline, 3 methylthio aniline, 4 methylthio aniline, 2 acetyl aniline, 3 acetyl aniline, 4 acetyl aniline, 2,3 diacetyl aniline, 3,4 diacetyl aniline, 3,5 diacetyl aniline, 2 carbmethoxy aniline, 3 carbmethoxy aniline, 4 carbmethoxy aniline, 2 carbethoxy aniline, 3 carbethoxy aniline, 4 carbethoxy aniline, 3 hydroxy aniline, 4 hydroxy aniline, 2 carbmethoxy-4-bromoaniline, 2 carbmethoxy-5-bromoaniline, 2 carbmethoxy-6-bromoaniline, 2 carbmethoxy-3-bromoaniline, 2 carbmethoxy-4-chloroaniline, 2 carbmethoxy-5-chloroaniline, 2 carbmethoxy-6-chloroaniline, 2 carbmethoxy-3-chloroaniline, 2 carbethoxy-4-bromoaniline, 2 carbethoxy-5-bromoaniline, 2 carbethoxy-6-bromoaniline, 2 carbethoxy-3-bromoaniline, 2 carbethoxy-4-chloroaniline, 2 carbethoxy-5-chloroaniline, 2 carbethoxy-6-chloroaniline, 2 carbethoxy-3-chloroaniline, 2 acetyl-4-bromoaniline, 2 acetyl-5-bromoaniline, 2 acetyl-6-bromoaniline, 2 acetyl-3-bromoaniline, 2 acetyl-4-chloroaniline, 2 acetyl-5-chloroaniline, 2 acetyl-6-chloroaniline, 2 acetyl-3-chloroaniline, 2 methoxy-4-bromoaniline, 2 methoxy-5-bromoaniline, 2 methoxy-6-bromoaniline, 2 methoxy-3-bromoaniline, 2 methoxy-4-chloroaniline, 2 methoxy-5-chloroaniline, 2 methoxy-6-chloroaniline, 2 methoxy-3-chloroaniline, mixed halogenated anilines such as 2-halo aniline, 3-halo aniline, 4-halo aniline, 2,3 diahalo aniline, 2,4 diahalo aniline, 2,5 diahalo aniline, 2,6 diahalo aniline, 3,4 diahalo aniline, 3,5 diahalo aniline, 2,3,4 trihalo aniline, 3,4,5 trihalo aniline, 2,4,5 trihalo aniline, 2,4,6 trihalo aniline, 3,4,5,6 tetrahalo aniline, 2,4,5,6 tetrahalo aniline, 2,3,5,6 tetrahalo aniline, and, 2,3,4,5,6 pentahalo aniline, N,N-ethyl ethyl amine, N,N ethanol ethyl amine, di ethanol amine, N,N propyl propyl amine, N,N propyl propoanol amine, di propanol amine, N,N butyl butyl amine, N,N butyl butanolamine, di propanol amine, di methyl amine, di ethyl amine, di propyl amine, and di butyl amine, among others.

In some embodiments where the functional group is an amine, the reactive modifying compound can include the pendent functional group, as discussed herein, and non-limiting examples of such reactive compounds include:

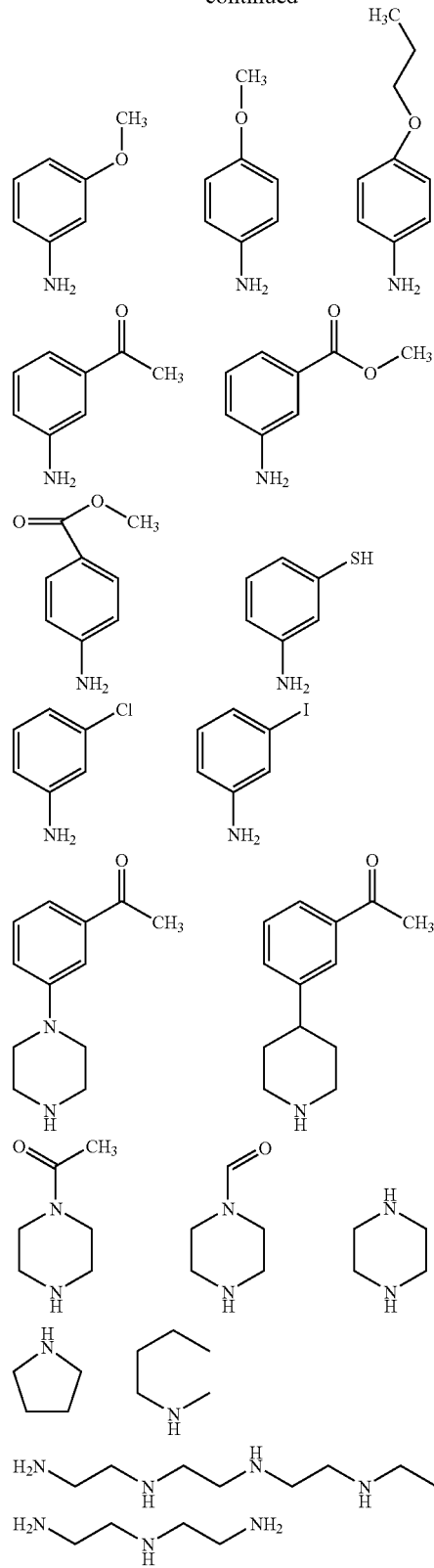

In some embodiments, the modifying composition containing an organic solvent and a reactive modifying compound can be a dehydration composition, where the modifying composition drives water from the discriminating layer using a condensation reagent such as N,N'-dicyclohexylcarbodiimide (DCC). In various embodiments, by driving the water from the discriminating layer, unreacted functional groups on the polyfunctional compound can react with a hydrolysis product of the polyfunctional acid halide (i.e., carboxylic acid) to form an amide linkage, an ester linkage, or an ether linkage.

Those skilled in the art will recognize that method embodiments of the present disclosure may be modified to include other steps. Coating procedures, such as the use of surfactants or other wetting agents to coat the porous support layer, post treatment of the membrane, rinsing the membrane with water, and so forth may also be used in the embodiments of the present disclosure.

In addition, as discussed herein, the membrane can include a porous support. The porous support can be a microporous support. In various embodiments, the microporous support can be a polymeric material containing pore sizes which are of sufficient size to permit the passage of permeate there through but not large enough so as to interfere with the bridging over of a thin polyamide membrane formed thereon. For example, the pore size of the support can range from one (1) nanometer (nm) to five hundred (500) nm. Pore diameters larger than five hundred (500) nm, can, in some instances, permit the polyamide membrane to sag into the pores, thus disrupting the flat sheet configuration desired in some embodiments. Examples of porous supports include those made of a polysulfone, a polyether sulfone, a polyimide, a polyamide, a polyetherimide, polyacrylonitrile, a poly(m-ethyl methacrylate), a polyethylene, a polypropylene, and various halogenated polymers, such as polyvinylidene fluoride. The porous support can also be made of other materials. In some embodiments, the porous support can have a thickness in a range of twenty-five (25) micrometers (μm) to one hundred twenty five (125) μm. As used herein, "permeate" refers to the purified product water produced by a membrane system.

Embodiments of the present disclosure also include multilayered membranes. In some instances, the multilayered membranes can be produced according to methods described herein. The multilayered membrane can include a porous substrate having a first side parallel to a second side and a modified discriminating layer including an inner side and an outer side, where the inner side is in operative contact with at least one side of the porous substrate. The outer side and a portion of the modified discriminating layer disposed between the inner side and the outer side include a plurality of pendent functional groups. The pendent functional groups can be connected to the modified discriminating layer by way of at least one of hydrogen bonding, ionic bonding, covalent bonding, physical entanglement, and chemical linkages, the chemical linkages being at least one of amides, sulfamides, urethanes, ureas, thioesters, and amines, including secondary amines, ternary amines, quaternary amines, and beta hydroxylamines.

As discussed herein, in embodiments where the pendent functional groups are connected to the modified discriminating layer by way of chemical linkages, the reactive modifying compound can be connected to the discriminating layer by reacting the functional group with residual reactive moieties on the discriminating layer. Therefore, the pendent functional groups on the modified discriminating layer correspond to the pendent functional groups attached to the reactive modifying compound, as discussed herein.

In some embodiments, the pendent functional group can be characterized as a moiety that changes the properties of the discriminating layer, compared to an unmodified discriminating layer. For example, the pendent functional group may alter the selectivity properties of the discriminating layer to solute molecules.

In some embodiments, the pendent functional groups can be connected to the modified discriminating layer by way of covalently bonding to the discriminating layer, making the pendent functional groups difficult to wash off the multilayered membrane. In addition, the pendent functional groups can form a thin layer at the top of the modified discriminating layer. By forming a thin layer of pendent functional groups at the top (i.e., outer side) of the modified discriminating layer, the pendent functional groups can be present in small amounts as compared to methods where the pendent functional groups are dispersed throughout a discriminating layer. Thus, a thin layer of pendent functional groups on the surface can decrease flux loss in embodiments where the selected pendent functional groups are known to cause flux loss.

In some embodiments, certain pendent functional groups can be chosen that, although not useful for making membranes alone, can be used to impart properties that would not otherwise be available in a membrane. For example, biocidal groups and metal-binding sites can be added. In additional embodiments, pendent functional groups can be chosen that are linking groups, where the pendent functional group can be used to attach other polymers to the modified discriminating layer surface.

Surface analysis techniques such as Secondary Ion Mass Spectroscopy (SIMS), Electron Scanning Chemical Analysis (ESCA), X-Ray Microscopy, Energy Dispersive X-Ray Analysis (EDX), and Scanning Transmission Electron Microscopy with Electron Energy Loss (TEM/EEL) can show the percentage of pendent functional groups in the discriminating layer.

In addition, SIMS analysis can be used to demonstrate that pendent functional groups are somewhat more concentrated near the surface of the discriminating layer, but also are connected to the discriminating layer through chemical linkages. Depending on the size and chemistry of the reactive modifying compound, pendent functional groups can be found throughout the discriminating layer, with slightly higher concentrations in the upper half of the depth of the discriminating layer, creating a multilayered membrane. This is in contrast with other methods of modifying a discriminating layer such as direct chlorination of polyamide discriminating layers where the chlorine groups attach to the discriminating layer throughout all portions of the discriminating layer.

As discussed herein, surface analysis techniques can be used to show the percentage of pendent functional groups in the discriminating layer. In some embodiments, ESCA can be used to quantify atomic surface percentages. For example, for modified MPD-TMC membranes, the percentage of pendent functional groups to MPD derived groups on the surface of the discriminating layer can be estimated. In some embodiments, anilines with halogens and thiols can be used as the reactive modifying compound and readily quantified by ESCA.

In such membranes, the atomic percentage of nitrogen and thus, the total number of amines on the surface of the discriminating layer before applying the modifying composition is due only to the MPD. However, after applying the modifying composition, the atomic percentage of nitrogen is from both the MPD and the anilines in the reactive modifying compound. To calculate the total surface percent of nitrogen, two considerations are important; first, an MPD derived moiety contains two nitrogens, and second, the depth of penetration of ESCA is on average most likely large enough to incorporate both nitrogens on the MPD. Using these considerations, the total nitrogen in terms of MPD and aniline can be written as shown in Equation 1:

Equation 1:

Percent Total Surface Nitrogen (% $TSN$) =

$N$ from $MPD$ + $N$ from Aniline = 2 × surface $MPD$ + Anilines

Then, if a thiol or a halogen is derived from a pendent functional group on the aniline, the atomic percentage of the sulfur or the halogen is a direct measure of the surface coverage of the anilines. As used herein, the atomic percentage of monothiol or mono-halogenated anilines will be represented as the atomic percentage, X %. In embodiments where anilines contain multiple pendent functional groups, the atomic percentage (X %) can be divided by the average number of pendent functional groups per reactive modifying compound. For mono-pendent functional group anilines, the surface coverage can be estimated using Equation 2:

Equation 2:

$$\frac{Aniline}{MPD} = \frac{\% X}{(\% TSN - Aniline) \times 0.5} = \frac{\% X}{(\% TSN - \% X) \times 0.5}$$

The approach described above is used in the examples below, in the Examples Section, to estimate the surface coverage for 3-thio aniline and for 3-chloro aniline on a membrane with a MPD-TMC discriminating layer. For example, in some embodiments the pendent functional groups comprise from about ten (10) to forty-five (45) percent of the modified discriminating layer, calculated as a percent added pendent functional groups to a chemical group of the discriminating layer, as discussed herein. In addition, in some embodiments the modified discriminating layer can have a ratio of a moiety derived from the pendent functional group in a region near the outer side of the modified discriminating layer as compared to a region near the inner side of the discriminating layer equal to approximately 1.5:1.

In some embodiments, the multilayered membrane can have a modified surface charge as compared to a membrane with an unmodified discriminating layer. Reducing the surface charge can reduce the organic fouling of a membrane, as well as producing other effects. For example, polyamide membranes produced by the interfacial polymerization of MPD and TMC can have two surface-bound changed species, due to the residual amine and acid. However, some operating conditions to produce the polyamide discriminating layer can produce MPD-TMC discriminating layers with to negative surface charge due to residual acid groups. In embodiments of the present disclosure, however, the multilayered membrane can have a nearly neutral charge as the residual acids are reacted with the functional group on the reactive modifying compound, as discussed herein, or as carboxylic acid groups are reacted with MPD via an additional condensation reagent such as N,N'-dicyclohexylcarbodiimide (DCC), as discussed herein.

Another important property of membranes is the surface energy of a membrane. Surface energy is a main effect controlling flux across a membrane, therefore, the surface energy of the membrane can be measured to determine whether a pendent functional group may cause a change in flux as compared to similar membranes without such functional groups.

By measuring how the surface energy changes when pendent functional groups are changed, the usefulness of pendent functional groups on the reactive modifying compound can be measured. In some embodiments, the order of improvement in flux by pendent functional groups on an aniline reactive modifying compound can be can be measured. In some embodiments, ketone can be approximately equal to multiple methyl ethers and thiol, ketone can be more useful than single methyl ethers, single methyl ethers can be more useful than esters, esters can be more useful than methiols, methiols can be more useful than primary amines, primary amines can be more useful than secondary amines, and secondary amines can be more useful than ternary amines. Or, ketone~multiple methyl ethers~thiol>single methyl ethers>esters>methiols>primary amines>secondary amines>ternary amines. In addition, in some embodiments, multiple pendent functional groups on a single reactive modifying compound can increase the effect on the flux improvement.

In some embodiments, when the pendent functional group on the modified discriminating layer is selected from ethers, ketones, and thiols, the multilayered membrane including the modified discriminating layer can improve the rejection rate for solutes including at least one of nitrate, silica, boric acid, arsenic, and selenium and metal salts as compared to membranes without a modified discriminating layer. In addition, the multilayered membrane can improve the rejection rate for small organics including at least one of alcohols, disinfection byproducts, halogenated solvents, pharmaceuticals, and endocrine disruptors. As used herein, "disinfection byproducts" refer to byproducts formed when disinfectants used in water treatment plants react with bromide and/or natural organic matter (i.e., decaying vegetation) present in source water. Different disinfectants produce different types or amounts of disinfection byproducts. Disinfection byproducts can include, but are not limited to, trihalomethanes, haloacetic acids, bromate, and chlorite. In addition, halogenated solvents can include, but are not limited to, methylene chloride (dichloromethane), methyl chloroform (1,1,1-Trichloroethane), perchloroethylene (tetrachloroethylene), and trichloroethylene, and pharmaceuticals can include antibiotics, antidepressants, birth control pills, seizure medication, chemotherapy drugs, antibiotics, hormones, analgesics, ibuprofen, aspirin, tranquilizers, cholesterol-lowering compounds, and caffeine, among others. Also, as used herein, an "endocrine disruptor" is a synthetic chemical that when absorbed into the body either mimics or blocks hormones and disrupts the body's normal functions. This disruption can happen through altering normal hormone levels, halting or stimulating the production of hormones, or changing the way hormones travel through the body, thus affecting the functions that these hormones control. Endocrine disruptors can include diethylstilbesterol, dioxin, polychlorinated biphenyls (PCBs), dichloro-diphenyl-trichloroethane (DDT), and some other pesticides, among others.

As discussed herein, in some embodiments, the chemical linkage in the modified discriminating layer can be made more rigid by using certain reactive modifying compounds. For example, a chemical linkage between the discriminating layer and an amide functional group on an aromatic reactive modifying compound can be more rigid than a chemical linkage between the discriminating layer and an amide functional group on an aliphatic reactive modifying compound In some embodiments, more rigid chemical linkages can produce multilayered membranes with a higher flux as compared to multilayered membranes with less rigid chemical linkages.

In some embodiments, the multilayered membrane of the present disclosure can be designed to reduce fouling. Fouling of membranes in water systems can limit the flux through the membrane, and ultimately, the service life of membranes. Fouling problems can include natural organic matter in the water, man-made matter such as soaps and oils, and bacterial growth. Fouling may also be caused by chemical or physical attraction of the membrane surface to chemicals in the retentate side of a membrane filtration unit. In addition, fouling from growth of microbes can increase when additional organic matter serves as food to the microbes.

The problem of fouling has previously been extensively studied and, although not wishing to be bound by theory, several "rules" for lower fouling have been suggested. Such rules can include aromatic surfaces (e.g., MPD-TMC) are more fouling than aliphatic surfaces (e.g., piperazine discriminating layers). Positively charged surfaces are more fouling than negatively charged surfaces. Smooth surfaces are less fouling than rough surfaces. Surfaces with biocides attached with specific linking group lengths remain biocidal. Specific metal ions on the surface have been shown to stop fouling of surfaces in seawater.

These generalities, however, are mostly for specific foulants. Natural organic matter like that found in surface waters can have different fouling solutions than fouling in oceans, bio-fouling, and fouling from synthetic contaminates like oil and surfactants.

Embodiments of the present disclosure can be designed to reduce fouling. In some embodiments, fouling can be reduced by creating a modified discriminating layer surface that is physically or chemically resistant to fouling, and/or by creating a biocidal membrane surface to kill microbes. In some embodiments, adding piperazine derived pendent functional groups to a discriminating layer can allow the surface charge to change from positive to negative, it can smooth the surface, and it can change the surface from aromatic to mostly aliphatic. In some embodiments, adding biocidal pendent functional groups can also change the surface charge.

As discussed herein, multilayered membranes of the present disclosure can allow for a greater range of selectivity toward different chemical compounds and ions. The selectivity can depend on which pendent functional group is linked to the modified discriminating layer. For example, for MPD-TMC discriminating layers, pendent functional groups such as 3-aminoacetophenone and 3-methoxyaniline can give significant improvements in sodium chloride, isopropyl alcohol, and sodium nitrate rejection.

A variety of membrane shapes are commercially available and useful in the present invention. These include spiral wound, hollow fiber, tubular, or flat sheet type membranes. In regard to the composition of the membrane, often the membrane has hygroscopic polymers other than the discriminating layer coated upon the surface of the discriminating layer. Among these polymers are polymeric surfactants, polyvinyl alcohol, poly vinyl pyrrolidone, and polyacrylic acid or polyhydric alcohols such as orbital and glycerin. In some embodiments, the formation of the discriminating layer can include contacting a complexing agent with the organic solvent prior to substantial reaction between the polyfunctional compound and at least one of a polyfunctional acid halide, a polyfunctional anhydride, and a polyfunctional dianhydride. Complexing agents can include those methods as described in, for example, U.S. Pat. No. 6,562,266. The presence of these polymers and complexing agents will generally not affect the embodiments of the present disclosure so long as the various reactive modifying compounds and the discriminating layer come into contact. If the discriminating layer is to be contacted after it is in final membrane form, then the shape and composition of the membrane should be such that the membrane is capable of being contacted with the described modifying composition and reactive modifying compounds.

As used herein, the following terms have the definitions provided: "rejection rate" is the percentage of a particular dissolved or dispersed material (i.e., solute) which does not flow through the membrane with the solvent. The rejection rate is equal to 100 minus the percentage of dissolved or dispersed material which passes through the membrane, i.e., solute passage, "salt passage" if the dissolved material is a salt. "Flux" is the flow rate at which solvent, typically water, passes through the membrane. "Reverse osmosis membrane" is a membrane which has a rejection rate for NaCl of from about 95 to 100 percent. "Nanofiltration membrane" is a membrane which has a rejection rate for NaCl of from about 0 to about 95 percent and has a rejection rate for at least one divalent ion or organic compound of from about 20 to about 100 percent.

SPECIFIC EMBODIMENTS OF THE DISCLOSURE

The following examples are provided for illustrative purposes only and are not intended to limit the scope of the present disclosure. In addition, some examples provided herein include the addition of complexing agents, as discussed herein, to improve the membrane flux obtained.

EXAMPLE 1

On a pilot plant membrane fabrication system, commercial polysulfone supports (i.e., porous substrates) are soaked in an aqueous solution of 5.2 weight per volume percent (wt./vol. %) meth-phenylene diamine (MPD), with the pH adjusted to a pH of approximately ten (10) by the addition of two (2) molar (M) sodium hydroxide. The support roll is pulled through a reaction table at constant speed. Following the MPD soaking, a thin, uniform layer of 0.14 wt./vol. % trimesoyl chloride (TMC) in high purity isoparaffinic solvent (ISOPAR L, Exxon) is applied to the membrane. Excess TMC solution is removed via air knife and suction cup. Then, after the TMC/solvent layer is applied, a ten (10) millimolar (mM) solution of a reactive modifying compound in the same solvent is applied on top of the polyamide discriminating layer in a thin, uniform layer. The line speed of the pilot plant machine is kept constant. Excess liquid is removed by an air knife and suction pump. The membrane is then passed through a water rinse tank and a drying oven, followed by a coating of a hygroscopic polymer.

Sample coupons are then cut from the roll and tested.

Table 1 presents data evaluating a MPD-TMC discriminating layer modified by a reactive modifying compound utilizing a test solution comprising an aqueous solution containing approximately thirty-two thousand (32,000) parts per million (ppm) sodium chloride (NaCl) at a transmembrane pressure of eight hundred (800) pounds per square inch (psi) (5,515,805.83 pascals) with a feed pH between seven (7) and eight (8). The flow through the samples is allowed to run for approximately thirty (30) minutes before testing.

TABLE 1

Flux of Membranes with a Modified Discriminating Layer.

| Reactive modifying compound (10 mM) | Flux (gfd) |
| --- | --- |
| 4-isopropylaniline | 9.9 |
| Piperazine | 17.6 |
| Control | 16.0 |

As can be seen from Table 1, the MPD-TMC discriminating layer loses a considerable amount of flux when the reactive modifying compound is 4-isopropylaniline. However, the flux of the membrane improves when the reactive modifying compound is piperazine.

EXAMPLE 2

Samples of polysulfone support are stored in water for at least three (3) hours. The polysulfone support is a non-woven web made of polyethylene terephthalate (PET), coated with a polysulfone solution from dimethyl formamide (DMF), and formed by processing in water. Samples of the polysulfone support are clipped to a metal frame and immersed in a 2.5 wt./vol. % solution of MPD for at least five (5) minutes. The support is placed on a paper sheet, and excess amine solution is nipped off, using a latex rubber roller.

Membranes 1, 2, 3, and 4 are prepared using a fifty (50) milliliter (ml) solution of TMC and ISOPAR L. The solution is prepared by adding approximately 49.3 ml of ISOPAR L to 0.86 ml of 5.2 wt./vol. % stock TMC solution. A rubber barrier is placed on the MPD coated support to form a well. The TMC solution is then poured into the well, left on the MPD-coated support for approximately one (1) minute, and then poured off. The MPD-TMC-coated support is rinsed with hexane for approximately thirty (30) seconds, and allowed to air dry for approximately one (1) minute before being placed in water. The samples are stored in water until tested.

Membrane 5 is prepared as described above for membranes 1, 2, 3, and 4 above using a solution of TMC, pyridine, and ISOPAR L. The solution is prepared by adding 0.86 ml of the 5.2 wt./vol. % TMC to 49.3 ml of a solution made from five (5) ml of fifty (50) mM pyridine in ISOPAR L.

Membrane 6 is prepared as described above for membranes 1, 2, 3, and 4 above using an approximately fifty (50) ml solution of TMC and ISOPAR L. However, after the draining off of the TMC solution after the approximately one (1) minute of contact, a five (5) mM pyridine solution is applied to the membrane and reacted for approximately thirty (30) seconds. Then, the pyridine solution is drained off and the membrane is rinsed with hexane for approximately thirty (30) seconds, followed by placing the membrane in water.

Membrane 7 is prepared as described above for membrane 5, however the TMC, pyridine, and ISOPAR L solution is made from adding twenty-five (25) ml of five (5) mM pyridine to a solution of 0.43 ml TMC in approximately 24.5 ml ISOPAR L.

Membranes 8 and 9 are prepared as described above for membrane 5. Membrane 8 is prepared by adding 0.85 ml TMC to 49.3 ml of a solution made from 12.4 ml of 5.2 mM dibutyl amine added to ISOPAR L. Membrane 9 is prepared by adding 0.85 ml TMC to 49.3 ml of a solution made from 6.25 ml of 5.2 mM dibutyl amine added to ISOPAR L.

Table 2 presents data evaluating the above prepared membranes utilizing a test solution comprising an aqueous solution containing approximately one thousand five hundred (1,500) ppm NaCl at a transmembrane pressure of one hundred fifty (150) psi (1,034,213.59 pascals).

TABLE 2

Sodium Chloride Rejection and Flux for Membranes with a Modified Discriminating Layer

| Membrane | NaCl Rejection (wt. %) | Flux (gfd) |
| --- | --- | --- |
| 1 | 99.16 | 13.6 |
| 2 | 99.25 | 16.3 |
| 3 | 99.25 | 5.1 |
| 4 | 99.38 | 15.0 |
| 5 | 99.23 | 25.0 |
| 6 | 99.34 | 15.9 |
| 7 | 99.22 | 19.6 |
| 8 | 99.58 | 4.17 |
| 9 | 99.53 | 6.37 |

As can be seen from Table 2, the addition of pyridine to the TMC solution, as shown by membrane 5, can enhance the flux of TMC-MPD membranes, however adding pyridine to the membrane after the TMC-MPD process, as shown by membrane 6, does not have the same effect on the flux. In addition, a greater concentration of pyridine in the TMC solution, as shown by membrane 7, enhances the flux of the TMC-MPD membrane, however, it is more significant with a smaller concentration of pyridine, as shown by membrane 5.

Also, the addition of dibutyl amine to the TMC solution enhances the sodium chloride (NaCl) rejection, as shown by membranes 8 and 9, however, membrane 9 shows an improvement in NaCl rejection while reducing the flux by less than membrane 8.

EXAMPLE 3

Membranes are prepared on a standard pilot coater as a continuous process at thirteen (13) feet per minute (fpm) (0.066 meters per second), using a formulation for a high-flux seawater membrane on a polysulfone porous substrate. First, a 3.5 weight percent (wt. %) solution of MPD is applied in water to the pre-made polysulfone porous substrate. The MPD application has a residence time of 156 seconds and the excess MPD solution is removed using a nip roller. A TMC dissolved in ISOPAR L is applied at 118 ml per square feet with a residence time of 132 seconds. At the oil-water interface a polyamide is formed.

The oil is then removed using an air knife and pump. Next, a modifying compound is applied. A series of runs are done with different concentrations of 3-chloro aniline and 3-thiol aniline. The concentrations vary from one (1) to fifteen (15) mM. The application rate of the modifying compound is the same as that used for the TMC solution and has a residence time of one hundred eighty (180) seconds. The excess modifying compound is removed using an air knife and pump. The membrane then travels through a room-temperature water bath to remove excess oil, then a ninety-eight (98) degrees Celsius (° C.) bath containing 3.5% glycerine. The residence time in the dip baths is thirty-seven (37) minutes. The membrane is then dried through an air-floatation dryer at a temperature of ninety-five (95)° C. for 10.6 minutes.

Tables 3 and 4 present data evaluating the above prepared membranes utilizing a test solution comprising an aqueous solution containing approximately two thousand (2,000) ppm NaCl at a transmembrane pressure of one hundred twenty-five (125) psi (861,844.662 pascals), five (5) ppm boric acid, one hundred (100) ppm isopropyl alcohol, and one hundred (100) ppm sodium nitrate.

TABLE 3

Flux of Membranes with Increasing Modifying Compound Concentration

| 3-Thiol Aniline (mM) | Flux (gfd) |
|---|---|
| 0 | 43.7 |
| 1 | 31.5 |
| 5 | 27.7 |
| 10 | 25.2 |
| 15 | 23.9 |

TABLE 4

Flux of Membrane with Increasing Modifying Compound Concentration

| 3-Chloro Aniline (mM) | Flux (gfd) |
|---|---|
| 0 | 43.7 |
| 1 | 30.6 |
| 5 | 19.5 |
| 10 | 17.5 |
| 15 | 18.4 |

As can be seen from both Table 3 and Table 4, a plateau is seen after the 10 mM is reached.

Tables 5 and 6 show ESCA analysis of the membranes prepared.

TABLE 5

ESCA of Membranes with a Modified Discriminating Layer

| 3-Thiol Aniline (mM) | [C] | [O] | [N] | [S] | % Surface Aniline/MPD |
|---|---|---|---|---|---|
| 0 | 73.0 | 13.0 | 13.8 | ND | 0 |
| 1 | 71.9 | 13.4 | 12.6 | 1.4 | 25.0 |
| 5 | 72.2 | 13.5 | 12.1 | 2.2 | 44.4 |
| 10 | 73.0 | 12.1 | 12.5 | 2.0 | 38.1 |
| 15 | 72.5 | 14.0 | 11.1 | 1.8 | 38.7 |

As can been seen from Table 5, the percent of carbon and oxygen, although showing some variation, stays relatively constant. Nitrogen-to-carbon ratio can be used to determine the structure of the polyamide discriminating layer. The ratio eliminates the effects on the atomic percentage due to various amounts of water absorbed into the surface of the discriminating layer. The sulfur percentage is a direct measure of the percentage of the aniline (3-thiol aniline) on the surface and ND indicates the nondetectable level of sulfur found in the control membrane.

Similarly, nitrogen is a measure of MPD exposed on the surface of the discriminating layer. For this analysis, it is assumed that if one nitrogen of a MPD moiety is exposed, then, on average, the other half can also be measured by ESCA, i.e., the other half is exposed or it is within the depth of penetration of the ESCA. Similarly, if the sulfur is exposed, then the nitrogen from the amide bond is also exposed. Any error due to some percentage not being accessible should be similar for both species. If the flow loss from Table 3 is taken together with the data from Table 5, for the highest concentration of 3-thio aniline (e.g., 15 mM), a 58% flow loss is due to 39% incorporation of the 3-thiol aniline. In addition, at an approximate saturation level (10 mM) of 42% flow loss, there is 38% aniline incorporation.

TABLE 6

ESCA of Membranes with a Modified Discriminating Layer

| 3-chloro aniline (mM) | [C] | [O] | [N] | [Cl] | % Surface Aniline/MPD |
|---|---|---|---|---|---|
| 0 | 73.0 | 13.0 | 13.8 | 0.1 | 1.5 |
| 1 | 71.4 | 14.3 | 13.4 | 0.7 | 11.0 |
| 5 | 72.2 | 13.8 | 12.8 | 1.3 | 22.6 |
| 10 | 73.2 | 13.3 | 12.3 | 1.2 | 21.6 |
| 15 | 72.4 | 13.3 | 13.0 | 1.3 | 22.2 |

As can be seen from Table 6 and Table 4, Table 6 shows a saturation level of both the aniline incorporation and the flux reduction. Table 6 shows a ratio of aniline to MPD of 11% (3-chloro aniline) and flow loss of 30%. The flow loss is calculated, for example, by subtracting the flux (gfd) of the membrane when one (1) mM 3-chloro aniline is applied from the flux (gfd) of the membrane when no 3-chloro aniline is applied to obtain a flux reduction amount. The flow loss is then equal to the percentage of the flux reduction amount as compared to the flux of the membrane when no 3-chloro aniline is applied. This calculation is shown below:

Flux(0 mM 3-chloro aniline)−Flux(1 mM 3-chloroaniline)=flux reduction amount Flow loss=100 (flux reduction amount/Flux(0 mM 3-chloroaniline))

At a saturation level of approximately 22% incorporation, there is a limiting flux loss of 58%, which is an average of the flow loss for the membranes with 5 mM, 10 mM, and 15 mM 3-chloro aniline applied.

The ESCA presented in Table 6 also allows for the examination of the atomic percentages directly. Since the saturation percentage of chlorine incorporated is about 1.3% and the sulfur incorporation is 2%, the extent of reaction is higher with 3-thio aniline than with 3-chloro aniline. The comparison of the Chlorine (Cl) or Sulfur (S) to Nitrogen (N) is important because surface contamination and water absorption affect the carbon and oxygen atomic percentages. By taking the Cl and S to N ratio, the excess carbon and oxygen from surface contamination and water will not affect the ratios.

EXAMPLE 4

BW30 membranes are obtained from FilmTec Corporation of Edina, Minn. A BW30 membrane is a commercial MPD-polyamide membrane designated commercially as BW30LE and BW30XLE. A formulation of MPD-polyamide membrane BW30XLE is modified by the method of the present disclosure by coating with reactive modifying compounds. In this example, the BW30 membrane is designated as a control.

FIG. 1 and Tables 7-12 present data evaluating the above prepared membranes utilizing a test solution comprising an aqueous solution containing approximately 2,000 ppm NaCl at a transmembrane pressure of 225 psi (1,551,320.39 pascals), 5 ppm boric acid, 100 ppm isopropyl alcohol, and 100 ppm sodium nitrate.

As can be seen from FIG. 1, the IPA passage of several non-aromatic amines is close to 10-15%. However, these are the uncoated controls, the BW30 control membrane, and the BW30LE control membrane. The modified membranes have relatively consistent sodium nitrate passage with a passage as low as 2.5%. In addition, the IPA passage for the membrane modified with 3-aminoacetophenone is 7%.

TABLE 7

Flux and Sodium Chloride, Isopropyl Alcohol, and Nitrate Passage Percentage in Membranes with a Modified Discriminating Layer

| Reactive modifying compound | Contact Angle | Flux (gfd) | NaCl Passage (wt. %) | Nitrate Passage (wt. %) | IPA Passage (wt. %) |
|---|---|---|---|---|---|
| Control | 62.7 ± 1.6 | 32.7 ± 1.3 | 1.08 ± 0.06 | 4.27 ± 0.21 | 13.61 ± 1.60 |
| 3-Br Aniline | 91.3 ± 4.0 | 12.7 ± 0.9 | 0.79 ± 0.05 | 2.00 ± 0.47 | 8.23 ± 0.99 |
| Tri-Cl aniline | 90.3 ± 2.0 | 25.0 ± 1.2 | 0.85 ± 0.07 | 2.55 ± 0.05 | 10.74 ± 1.02 |
| 4-amino phenyl disulfide | 78.3 ± 0.6 | 15.9 ± 2.4 | 0.80 ± 0.05 | 1.78 ± 0.21 | 13.68 ± 3.61 |
| N-methyl 4-methoxy aniline | 67.0 ± 2.6 | 25.6 ± 1.5 | 0.81 ± 0.04 | 3.01 ± 0.12 | 10.78 ± 0.78 |
| 4-methoxy aniline | 63.3 ± 2.1 | 23.5 ± 1.3 | 0.77 ± 0.05 | 2.52 ± 0.15 | 12.18 ± 3.11 |
| amino ademantane alcohol | 47.8 ± 3.3 | 35.4 ± 0.2 | 1.21 ± 0.05 | 5.14 ± 0.12 | 14.24 ± 0.23 |
| amino crotenoic acid methyl ester | 49.8 ± 1.0 | 34.6 ± 2.7 | 1.06 ± 0.05 | 4.46 ± 0.42 | 13.83 ± 0.45 |
| N-methyl homoveratryl amine | 45.7 ± 1.5 | 34.6 ± 0.9 | 1.07 ± 0.13 | 4.53 ± 0.22 | 16.80 ± 0.48 |
| Control | 60.2 ± 0.3 | 36.4 ± 1.5 | 0.94 ± 0.03 | 4.07 ± 7.11 | 17.68 ± 5.30 |

As can be seen from Table 7, the aromatic disulfide behaves similarly to the standard halogenated aniline. The 4-methoxy aniline and the N-methyl versions are also similar to the halogenated aniline. The three other variations with large amounts of aliphatic nature and high mobility result in little change in performance, in contrast to the dimethoxy anilines, which show large flux changes and large improvements in solute passage.

TABLE 8

Flux and Sodium Chloride, Isopropyl Alcohol, and Nitrate Passage Percentage in Membranes with a Modified Discriminating Layer

| Reactive Modifying Compound | Flux (gfd) | NaCl Passage (wt. %) | IPA Passage (wt. %) | Nitrate Passage (wt. %) |
|---|---|---|---|---|
| None | 30.97 ± 2.88 | 3.05 ± 0.12 | 21.00 ± 1.18 | 10.42 ± 0.76 |
| 1-acetyl-piperazine (10 mM) | 35.96 ± 4.11 | 2.93 ± 0.28 | 20.31 ± 1.31 | 13.16 ± 0.45 |
| 3-amino acetophenone (5 mM) | 19.47 ± 1.05 | 0.99 ± 0.17 | 6.99 ± 2.34 | 3.02 ± 0.32 |
| Morpholine (15 mM) | 36.75 ± 1.55 | 2.92 ± 0.25 | 21.31 ± 2.36 | 13.53 ± 1.08 |
| m-Phenetidine (5 mM) | 17.13 ± 0.94 | 0.88 ± 0.03 | 9.42 ± 2.96 | 2.56 ± 0.50 |
| Bis (2-methoxyethyl) amine (15 mM) | 29.99 ± 1.54 | 2.26 ± 0.08 | 19.61 ± 1.35 | 10.54 ± 0.86 |
| Ethyl 3-aminobenzoate (5 mM) | 13.40 ± 0.66 | 1.64 ± 1.83 | 9.84 ± 1.91 | 2.82 ± 1.73 |
| None | 37.25 ± 2.92 | 2.62 ± 0.40 | 18.64 ± 1.69 | 9.58 ± 0.69 |

As can be seen from Table 8, three anilines (3-amino acetophonone, m-phenetidine, ethyl 3-amino benzoate) show substantial improvement in the solute passage. These are anilines with aromatic amides, ketones, ethers, and esters. Both morpholine and bis(2-methoxyethyl) amine show no substantial changes in performance, although there is a slight improvement in solute passage with the diether.

TABLE 9

Flux and Sodium Chloride, Isopropyl Alcohol, and Nitrate Passage Percentage in Membranes with a Modified Discriminating Layer

| Reactive Modifying Compound | Flux (gfd) | NaCl Passage (wt. %) | IPA Passage (wt. %) | Nitrate Passage (wt. %) |
|---|---|---|---|---|
| Control | 37.85 ± 1.23 | 5.32 ± 0.80 | 21.76 ± 1.97 | 11.85 ± 0.65 |
| 3-methoxy aniline | 23.72 ± 1.19 | 2.77 ± 1.90 | 7.66 ± 3.60 | 4.33 ± 1.08 |
| 4-methoxy aniline | 26.46 ± 1.18 | 2.66 ± 0.24 | 14.15 ± 1.01 | 6.28 ± 0.36 |
| 3,5 dimethoxy aniline | 27.94 ± 1.95 | 1.84 ± 0.44 | 11.00 ± 0.58 | 4.81 ± 0.29 |
| 3,4 ether ring aniline | 28.14 ± 2.59 | 2.86 ± 0.74 | 12.57 ± 3.54 | 6.49 ± 0.48 |
| 3-amino aceto-phenone | 19.79 ± 0.83 | 1.57 ± 0.04 | 6.67 ± 3.49 | 3.60 ± 0.44 |
| 4-amino methyl benzoate | 24.30 ± 1.31 | 2.02 ± 0.23 | 10.73 ± 2.10 | 5.07 ± 0.47 |
| 4-amino ethyl benzoate | 21.78 ± 0.98 | 2.24 ± 0.82 | 10.51 ± 2.41 | 4.41 ± 0.73 |
| 3 F aniline | 29.98 ± 1.13 | 2.40 ± 0.28 | 12.38 ± 1.52 | 5.52 ± 0.18 |
| 3 Cl aniline | 24.34 ± 1.31 | 2.00 ± 0.18 | 11.40 ± 1.75 | 4.09 ± 0.47 |
| 3 Br aniline | 45.75 ± 4.25 | 3.79 ± 0.45 | 22.92 ± 5.64 | 11.44 ± 0.26 |
| control | 21.26 ± 1.18 | 1.25 ± 0.20 | 13.05 ± 2.30 | 4.10 ± 0.38 |

As can be seen from Table 9, the experiment compares the effect of different halogenated aniline and oxygen containing aliphatic derivatives of aniline. As shown, 3 amino acetophenone, 3 methoxy aniline, and 3,5 dimethoxy aniline demonstrate reduce NaCl, IPA, and sodium nitrate passage.

TABLE 10

Flux and Sodium Chloride, Borate, Isopropyl Alcohol, and Nitrate Passage Percentage in Membranes with a Modified Discriminating Layer

| Reactive Modifying Compound | Flux (gfd) | NaCl Passage (wt. %) | Borate Passage (wt %) | Nitrate Passage (wt %) | IPA Passage (wt %) |
|---|---|---|---|---|---|
| Control | 34.33 ± 1.05 | 0.79 ± 0.04 | 43.3 ± 6.66 | 3.66 ± 0.57 | 12.3 ± 2.20 |
| 3-(methylthiol) aniline | 9.76 ± 0.45 | 0.81 ± 0.14 | 28.8 ± 9.23 | 1.74 ± 0.54 | 10.3 ± 2.44 |
| Thio morpholine | 34.67 ± 0.99 | 1.09 ± 0.14 | 38.3 ± 4.84 | 3.43 ± 0.91 | 11.0 ± 0.90 |
| hexanoyl chloride | 30.79 ± 1.68 | 0.83 ± 0.08 | 37.4 ± 0.91 | 2.75 ± 0.95 | 10.5 ± 1.10 |
| 1,9-diamino nonane | 23.89 ± 0.99 | 2.04 ± 0.11 | 37.7 ± 1.82 | 6.49 ± 3.50 | 13.6 ± 3.23 |
| morpholine | 39.61 ± 1.07 | 1.51 ± 0.21 | 48.2 ± 2.46 | 6.57 ± 2.15 | 15.7 ± 3.74 |
| control | 35.93 ± 1.42 | 1.04 ± 0.05 | 45.3 ± 1.22 | 4.37 ± 1.07 | 13.8 ± 1.35 |

As can be seen from Table 10, a comparison of NaCl, sodium nitrate, borate (pH 8), and IPA passage for an aniline and three aliphatic pendent modified membranes is given. The 3-(methyl thiol) aniline has the lowest flux (10 gfd) and much better borate passage 29% vs. 43%, and nitrate passage 1.7% vs. 3.7%. Table 10 also shows the comparison of an aliphatic amide with a cyclic ether or thiol. This is the comparison of morpholine and thiomorpholine. The morpholine modified membrane shows worse solute passage, while the thiomorpholine shows improved solute passage. Table 10 also shows an increased solute passage when 1, 9 diamino nonane is used.

TABLE 11

Isopropyl Alcohol, Borate, and Nitrate Passage Percentage in Membranes with a Modified Discriminating Layer

| Reactive Modifying Compound | Concentration (mM) | Borate Passage (wt %) | Nitrate Passage (wt %) | IPA Passage (wt %) |
|---|---|---|---|---|
| 3-amino thio phenol | 1 | 20.1 ± 0.2 | 2.52 ± 2.30 | 7.57 ± 2.45 |
|  | 5 | 21.3 ± 0.5 | 2.56 ± 1.79 | 6.39 ± 0.66 |
|  | 10 | 21.1 ± 0.4 | 1.40 ± 0.08 | 6.58 ± 0.90 |
|  | 15 | 20.3 ± 0.4 | 3.14 ± 1.51 | 9.30 ± 2.30 |
| 3-Chloro aniline | 1 | 21.1 ± 0.4 | 1.54 ± 0.17 | 7.18 ± 2.24 |
|  | 5 | 17.0 ± 0.0 | 1.63 ± 0.32 | 8.37 ± 1.94 |
|  | 10 | 16.2 ± 0.4 | 1.46 ± 0.36 | 6.52 ± 0.95 |
|  | 15 | 16.5 ± 0.5 | 1.68 ± 0.84 | 5.96 ± 1.01 |
| Acetyl piperazine | 1 | 28.3 ± 0.5 | 2.19 ± 1.14 | 7.84 ± 2.25 |
|  | 5 | 28.0 ± 0.2 | 2.98 ± 1.58 | 7.89 ± 1.42 |
|  | 10 | 30.3 ± 0.2 | 2.87 ± 1.59 | 10.34 ± 3.12 |
|  | 15 m | 30.8 ± 0.7 | 4.04 ± 2.16 | 10.53 ± 3.85 |

As can be seen from Table 11, the addition of 3-chloro aniline reduces the Borate passage to a certain extent as the concentration increases, from 21.1 wt % to 16.5 wt %. Also, the addition of 3-chloro aniline reduces the IPA passage as the concentration increases, from 7.18 wt % to 5.96 wt %. However, adding increasing concentrations of acetyl piperazine and 3-aminothiophenol did not seem to significantly improve borate, nitrate, or IPA passage. In the example of acetyl piperazine, on the other hand, keeping the concentration of acetyl piperazine low, (i.e., 1 mM) decreased the nitrate passage more dramatically than having higher concentrations of acetyl piperazine, as compared to the control in Table 10.

TABLE 12

Flux and Sodium Chloride Passage Percentage in Membranes with a Modified Discriminating Layer

| Reactive Modifying Compound | Concentration (mM) | Flux | NaCl Passage (wt. %) |
|---|---|---|---|
| None |  | 41.32 ± 1.47 | 4.12 ± 2.31 |
| 4-piperazine acetophenone | 2.5 | 39.61 ± 0.92 | 3.35 ± 0.44 |
| 1-piperazine carboxaldehyde | 10 | 41.69 ± 2.27 | 3.06 ± 0.66 |
| 3-amino acetophonone | 10 | 18.83 ± 0.15 | 0.80 ± 0.04 |
| 3,5 dimethoxy aniline | 10 | 23.57 ± 2.65 | 1.38 ± 0.10 |
| 3,4 methylenedioxy aniline | 10 | 29.41 ± 0.49 | 1.47 ± 0.10 |
| piperonyl piperazine | 10 | 25.41 ± 0.63 | 6.13 ± 2.32 |
| None |  | 41.37 ± 1.50 | 4.26 ± 3.13 |

As can be seen from Table 12, the use of piperazine as a linking group between phenyl groups has been shown to improve the solute passage. Table 12 has a comparison of 4-piperazine acetophenone and piperonyl piperazine to 3,4 methylenedioxy aniline, 3,5 dimethoxy aniline, and 3-amino acetophenone. The presence of the ternary amine in both cases causes either worse solute passage (piperonyl piperazine) or only slightly better solute passage (4-piperazine acetophenone). The flux is only slightly reduced when 4-piperazine acetophenone (40 gfd vs. 41 gfd) is used, but much lower for 3-amino acetophenone (19 gfd). Piperonyl piperazine, as the modifying compound, reduces the flux from 41 gfd to 25 gfd, and using 3,4 methylenedioxy aniline the flux is 29 gfd.

EXAMPLE 5

Membranes are prepared on a standard pilot coater as a continuous process at thirteen (13) feet per minute (fpm) (0.066 meters per second), using a formulation for a high-flux seawater membrane on a polysulfone porous substrate. First, a 3.5 weight percent (wt. %) solution of MPD is applied in water to the pre-made polysulfone porous substrate. The MPD application has a residence time of 156 seconds and the excess MPD solution is removed using a nip roller. A TMC dissolved in ISOPAR L is applied at 118 ml per square feet with a residence time of 132 seconds. At the oil-water interface a polyamide is formed.

The oil is then removed using an air knife and pump. In some instances, a modifying compound is applied. A series of runs are done with 3-aminothiophenol, 3-chloroaniline, acetyl piperazine, amino crotenoic acid methyl ester, 3,5-dimethoxy aniline, and 3-aminoacetophenone at a concentration of 5 mM. The application rate of the modifying compound is the same as that used for the TMC solution and has a residence time of 180 seconds. The excess modifying compound is removed using an air knife and pump. The membrane then travels through a room-temperature water bath to remove excess oil, then a ninety-eight (98) degrees Celsius (° C.) bath containing 3.5% glycerine. The residence times in the dip baths is thirty-seven (37) minutes. The membrane is then dried through an air-floatation dryer at a temperature of ninety-five (95)° C. for 10.6 minutes.

Table 13 presents the membrane designations.

TABLE 13

Membrane Designations, Type, and Modifying Compound

| Membrane Designation | Membrane Type and Modifying Compound |
|---|---|
| RO-1 | BW30XLE (FilmTec Corp., Edina, MN) |
| RO-2 | BW30 Membrane (FilmTec Corp., Edina, MN) |
| RO-3 | Polyamide membrane of the present disclosure modified with 3-aminothiophenol |
| RO-4 | Polyamide membrane of the present disclosure modified with 3-chloroaniline |
| RO-5 | Polyamide membrane of the present disclosure modified with acetyl piperazine |
| RO-6 | Polyamide membrane of the present disclosure modified with amino crotenoic acid methyl ester |
| RO-7 | Polyamide membrane of the present disclosure modified with 3,5-dimethoxy aniline |
| RO-8 | Polyamide membrane of the present disclosure modified with 3-aminoacetophenone |
| NF | NF-200 Membrane (FilmTec Corp., Edina, MN) |

To observe biofilm formation potential on the surface of Reverse Osmosis (RO) and Nano-filtration (NF) membranes, a biofilm formation study is carried out in a rotating disk reactor (RDR) system. Three RDR are used and nine (RO and NF) membrane swatches are adhered onto polycarbonate coupons by silicon rubber sealant in RDR systems. Table 14 shows the distribution of RO and NF membranes in the different reactors.

TABLE 14

Distribution of Membranes in Rotating Disk Reactor Systems

| Reactor 1 (R1) | Reactor 2 (R2) | Reactor 3 (R3) |
|---|---|---|
| RO-1 | RO-1 | RO-1 |
| RO-2 | RO-2 | RO-2 |
| NF | NF | |
| RO-3 | RO-4 | RO-5 |
| RO-6 | RO-7 | RO-8 |

Each reactor is operated for thirty-one (31) days. The feed to the reactors is biological activated carbon (BAC) treated water. To enhance the growth of biofilm, nutrients (Carbon: Nitrogen:Potassium), are added to the reactors. Glutamic acid, glucose, galactose, and arabinose are used for a carbon source, potassium nitrate ($KNO_3$) is used for a nitrogen source, and potassium phosphate ($K_2HPO_4$) is used for a potassium source. The carbon source, nitrogen source, and potassium source are added to the reactors in a molar ratio of 100:10:1 corresponding to 5.54 ml carbon source, 16.88 ml nitrogen source, and 4.00 ml potassium source in a twenty (20) liter (L) container of nanopure water. The flow rate of nutrient (C:N:P) and BAC treated water are 0.50 ml/min and 0.70 ml/min, respectively. The average culture-forming unit per milliliter (CFU/ml) in the BAC treated water is 1.35 to about $1.9 \times 10^4$ CFU/ml during the experiment. The temperature inside the reactor is maintained at twenty-five (25)° C. throughout the experiment to nullify the effect of temperature of biofilm growth, the ambient temperature is also close to twenty-five (25)° C. The rotation speed of the rotor in the RDR is fifty (50) rotations per minute (rpm) in all reactors.

The RO and NF membranes in the three RDR reactors are examined after thirty-one (31) days of operation using the cryo-sectioning (cryo) and live/dead staining (L/D). Table 15 shows what analysis is performed on each membrane.

TABLE 15

Designation of Type of Membrane Analysis for each Membrane

| Reactor 1 (R1) | Reactor 2 (R2) | Reactor 3 (R3) |
|---|---|---|
|  | Cryo & L/D |  |
|  | Cryo & L/D |  |
|  | Cryo & L/D |  |
| Cryo & L/D | Cryo & L/D | Cryo & L/D |
| Cryo & L/D | Cryo & L/D | Cryo & L/D |

The membranes are taken out from coupons using sterilized razor blade and hemostats without disturbing the surface of membrane containing biofilm. For membrane cryo-sectioning analysis, a Cryostate Series #Leica CM 1850 is used and the thickness of each membrane slice is 5.0 micrometers (μm).

LIVE/DEAD BacLight™ is used for Live/Dead staining of cells on the surface of the membrane. This kit contains SYTO 9 (3.34 mM) and propidium iodide (20 mM) dyes. To stain the cells on the membrane, the same amount, 1.5 μl/ml of SYTO 9 and propidium iodide dyes, are diluted in one (1) ml of nanopure water and after proper dilution, dyes are added to the top surface of a membrane and incubated for one hour. After incubation, the excess dye is washed off and the stained membranes are observed under epiflourescence microscope (Microscope Series # Nikon, Eclipse E 800, Japan) by 100× object.

Figure 2:
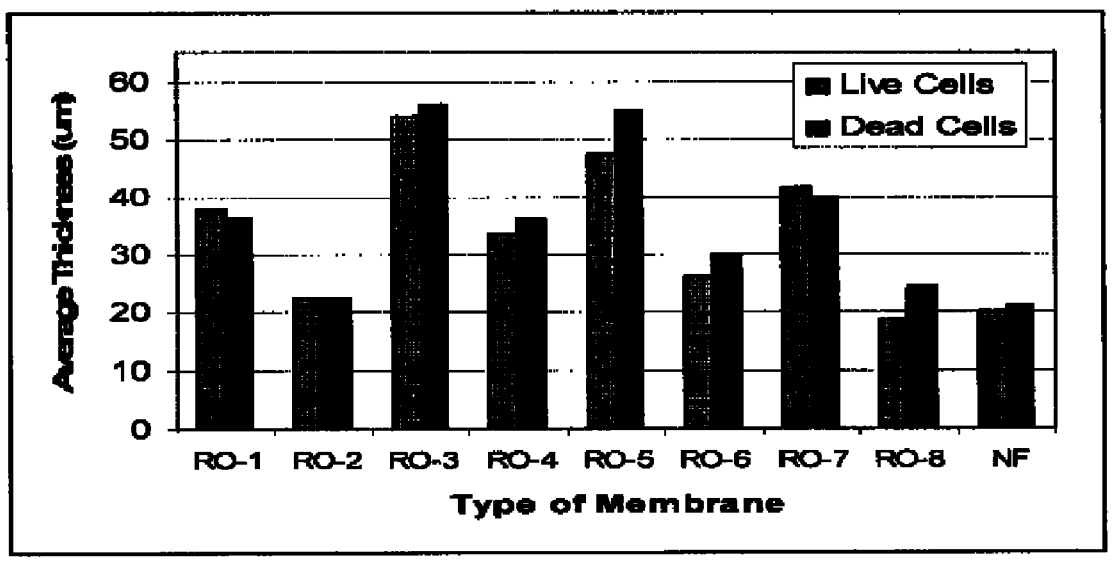
FIG. 2 presents the cryo-sectioning analysis resulting from each membrane.

For the cryo-sectioning analysis, 15 cryo-sections are taken from each slice of membrane which are 5-μm thick, and one line scan images of live and dead cells are taken. The values are then turned into a data set using Metamorph surface topography image analysis software. Each image gives different distributions of live and dead cells along the thickness of biofilm on the membrane. To calculate the thickness at which live and dead cells occur in each image, the width at the mid-height is taken. FIG. 2 shows a summary of cryo-sectioning analyses results of all membranes. Each bar for each membrane represents average thickness (15 slices of membranes) of either live or dead cells.

As can be seen in FIG. 2, on the surface of RO-1 and RO-7, the relative number of live cells is more than that of dead cells. In addition, if the results of the commercial membranes, RO-1 and RO-2, are compared to the membranes with a modifying compound, the membrane that has 3-amino acetophenone as the modifying compound, RO-9, has the lowest number of live cells and one of the lowest numbers of dead cells. The only other membrane that shows better cell counts is the NF membrane.

Based upon the thickness of the cryo-sectioning images, the approximate accumulation rate of the biofilm is calculated as shown in Equation 3:

Equation 3:

$$\text{Average Growth of Biofilm} = \frac{\text{Average thickness of biofilm}(\mu m)}{\text{Period of operation}(\text{days})}$$

This analysis is simplistic since a membrane biofilm is a complex, heterogeneous, and multilayer-mixed structure. However, Table 16 shows the average growth of biofilm for each membrane in descending growth rate order.

TABLE 16

Average Growth of Biofilm for each Membrane

| Membrane | Average growth of Dead cells (μm/day) | Membrane | Average Growth of Live Cells (μm/day) |
|---|---|---|---|
| RO-3 | 1.82 | RO-3 | 1.73 |
| RO-5 | 1.78 | RO-5 | 1.53 |
| RO-7 | 1.30 | RO-7 | 1.34 |
| RO-4 | 1.18 | RO-1 | 1.21 |
| RO-1 | 1.17 | RO-4 | 1.08 |
| RO-6 | 0.97 | RO-6 | 0.86 |
| RO-8 | 0.76 | RO-2 | 0.75 |
| RO-2 | 0.74 | NF | 0.64 |
| NF | 067 | RO-8 | 0.61 |

Based on the cryo-sectioning analysis and the number of days of observation, it appears that the maximum average growth of biofilm is less than 1 μm/day on the surface of membranes RO-6, RO-2, NF, and RO-8. In addition, it appears from Table 16 that using 3-aminoacetophenone and 3-chloroaniline as the modifying compound reduces bio-growth on the surface of the membranes.

What is claimed:

1. A method for modifying a polyamide discriminating layer of a membrane by applying a modifying composition to at least a surface portion of the discriminating layer, wherein the method is characterized by the modifying composition comprising a phenyl amine compound including at least one pendent functional group selected from: thiols and acetyls.

2. The method of claim 1 wherein at least one pendent functional group of the phenyl amine compound is selected from: thio, hydrothio and methylthio.

3. The method of claim 1 wherein the modifying composition comprises aminothiophenol.

4. The method of claim 1 wherein the modifying composition comprises aminoacetophenone.

5. The method of claim 1 wherein the modifying composition further comprises an organic solvent.

6. The method of claim 1 wherein the polyamide discriminating layer is formed by interfacially polymerizing a polyfunctional amine and a polyfunctional acid halide, and wherein the step of applying the modifying composition is performed after the initiation of the interfacial polymerization of the polyfunctional amine and polyfunctional acid halide.

7. The method of claim 6 wherein the polyamide discriminating layer is dried, and wherein the step of applying the modifying composition is performed prior to drying the polyamide discriminating layer.

8. The method of claim 6 wherein the polyamide discriminating layer is washed, and wherein the step of applying the modifying composition is performed prior to washing the polyamide discriminating layer.

9. The method of claim 1 wherein the polyamide discriminating layer is formed upon a porous support.

10. A composite membrane comprising a porous support and a polyamide discriminating layer having an inner side and outer side, the inner side of the discriminating layer in contact with the porous support, and
wherein the membrane is characterized by the polyamide discriminating layer having a relatively higher concentration of moieties derived from phenyl amine compounds including at least one pendent functional group selected from: thiols and acetyls, in a region near the outer side of the discriminating layer as compared with a region near the inner side.

11. The membrane of claim 10 wherein the ratio of moieties derived from thiols in the region near the outer side of the discriminating layer as compared to the region near the inner side of the discriminating layer is approximately 1.5:1.

12. The membrane of claim 10 wherein the region near the outer side of the discriminating layer has an atomic percentage of Sulfur from about 1.4 to about 2.2.

13. The membrane of claim 10 wherein the moieties derived from thiols comprise thioester linkages.

* * * * *